(12) United States Patent
Terada

(10) Patent No.: US 6,736,018 B2
(45) Date of Patent: May 18, 2004

(54) MACHINE CONSTANT ESTIMATION DEVICE

(75) Inventor: Kei Terada, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 13 days.

(21) Appl. No.: 10/182,794

(22) PCT Filed: Dec. 14, 2000

(86) PCT No.: PCT/JP00/08865
§ 371 (c)(1),
(2), (4) Date: Aug. 2, 2002

(87) PCT Pub. No.: WO02/49201
PCT Pub. Date: Jun. 20, 2002

(65) Prior Publication Data
US 2003/0233887 A1 Dec. 25, 2003

(51) Int. Cl.[7] ............................................... G01D 9/00
(52) U.S. Cl. .................................... 73/862.27; 702/145
(58) Field of Search ....................... 73/862.27; 702/145

(56) References Cited

U.S. PATENT DOCUMENTS

| | | | |
|---|---|---|---|
| 6,226,585 B1 * | 5/2001 | Cullen ........................... | 701/54 |
| 6,379,283 B1 * | 4/2002 | Cullen ........................... | 701/54 |
| 2001/0042529 A1 * | 11/2001 | Kawasaki et al. ......... | 123/90.15 |
| 2002/0026930 A1 * | 3/2002 | Ueno et al. ................. | 701/109 |

FOREIGN PATENT DOCUMENTS

| | | |
|---|---|---|
| JP | 6-95703 | 4/1994 |
| JP | 8-249031 | 9/1996 |
| JP | 11-313495 | 11/1999 |

OTHER PUBLICATIONS

Yoichi Hori, et al. "High–performance Control of a Servomotor using a Low Precision Shaft Encoder—Instantaneous Speed Observer and Identification of the Inertia Moment" T. IEE Japan, vol. 114–D, No. 4, 1994, pp. 424–431.

* cited by examiner

*Primary Examiner*—Edward Lefkowitz
*Assistant Examiner*—Takisha S Miller
(74) *Attorney, Agent, or Firm*—Sughrue Mion, PLLC

(57) ABSTRACT

An acceleration signal generating portion 11 inputs a machine velocity vm of a drive machine 32 and outputs an acceleration signal af of low frequency. Also, a pseudo torque signal generating portion 12 inputs a torque command τr, removes the noise, and outputs a pseudo torque signal τf of low frequency. Also, a torque error signal calculating portion 14 subtracts a product of the acceleration signal af and a previous mechanical constant estimated value Je(k−1) calculated in a multiplication circuit 13 from the pseudo torque signal τf of low frequency, and outputs a torque error signal τerr as a disturbance torque estimated value τd0. Also, a mechanical constant estimation gain portion 16 estimates the mechanical constant by inputting a torque error derivative signal dτerr that is generated by torque error derivative signal generating portion 15 by inputting a torque error signal τerr. Also, a mechanical constant estimation gain portion 16 starts or stops to update the mechanical constant estimating operation, based on a disturbance torque estimated value τd0, or alters the mechanical constant estimation gain. Also, a mechanical constant estimated value operating portion 17 adds the previous mechanical constant estimated value Je(k−1) to the error output from the mechanical constant estimation gain portion 16, and outputs the mechanical constant estimated value Je(k).

5 Claims, 9 Drawing Sheets

MACHINE CONSTANT ESTIMATION DEVICE

FIELD OF THE INVENTION

The present invention relates to a mechanical constant estimating device for estimating a mechanical constant such as an inertial moment in a drive machine such as a machine tool or a robot employing an actuator such as a motor.

BACKGROUND ART

To control a drive machine such as a machine tool or a robot employing an actuator such as a motor at high precision and stably, it is required to estimate the mechanical constant such as an inertial moment for the drive machine correctly.

FIG. 6 is a block diagram of a velocity control system containing a conventional mechanical constant estimating device, which has the configuration equivalent to that of a control device for an electric motor servo system having an auto-tuning function capable of setting the convergence of control gain as described in JP-A-11-313495.

In FIG. 6, reference numeral 30 denotes a torque command generating portion for generating a torque command τr based on a velocity command (not shown), 31 denotes an actuator such as a motor for generating a drive torque τm in accordance with the torque command τr, 32 denotes a drive machine that is driven by the actuator 31, 33 denotes a velocity detector for detecting a machine velocity vm of the drive machine 32, and 34 denotes a mechanical constant estimating device for estimating an inertial moment estimated value Je by inputting the machine velocity vm and the torque command τr. Reference symbol τd denotes a disturbance torque applied to the drive machine 32.

Also, the torque command generating portion 30 alters the internal constant such as a gain (auto-tuning), based on the inertial moment estimated value Je output from the mechanical constant estimating portion 34, and generates the torque command τr in accordance with the inertial moment estimated value Je.

FIG. 7 is a block diagram showing the configuration of a conventional mechanical constant estimating device, which is equivalent to the configuration of a mechanical constant estimating device based on an inertial moment estimating operation expression using a sequential least squares method as described in the Institute of Electrical Engineers of Japan, treatise journal, Vol.114-D, No.4, p.424–p.431.

In FIG. 7, reference numeral 41 denotes an acceleration variation signal generating portion for generating an acceleration variation signal da through the signal processing by inputting a machine velocity vm, 42 denotes a torque variation signal generating portion for generating a torque variation signal dτ through the signal processing by inputting a torque command τr, 43 denotes a multiplication circuit for calculating the product of the acceleration variation signal da and a previous inertial moment estimated value Je(k−1) held in an inertial moment estimated value holding portion 47, 44 denotes a subtracter for subtracting the product of the acceleration variation signal da and the previous inertial moment estimated value Je (k−1) calculated in the multiplication circuit 43 from the torque variation signal dτ, and 45 denotes an estimation gain portion for inputting a signal in which the product of the acceleration variation signal da and the previous inertial moment estimated value Je(k−1) is subtracted from the torque variation signal dτ and outputting an error from the previous inertial moment estimated value Je(k−1). Also, reference numeral 46 denotes an operating portion for adding the previous inertial moment estimated value Je(k−1) to the error output from the estimation gain portion 45 and outputting the inertial moment estimated value Je(k), and 47 denotes an inertial moment estimated value hold portion for holding the inertial moment estimated value Je.

Referring to FIGS. 6 and 7, the operation of the conventional mechanical constant estimating device will be described below. It is assumed here that the driving torque τm actually produced in the actuator 31 coincides with the torque command τr.

Supposing that the machine velocity of the drive machine 32 detected by the velocity detector 33 is vm, the machine acceleration am of the drive machine 32 is represented by the following expression (1).

$$am = s \cdot vm \tag{1}$$

In the above expression, s is the Laplace operator.

Also, supposing that the disturbance torque applied to the drive machine 32 is τd, and the inertial moment (true value) for the drive machine 32 is J, the torque commander τr is represented by the following expression (2).

$$\tau r = \tau d + J \cdot am \tag{2}$$

For simpler explanation, if the torque command τr is denoted in a continuous time system, and the torque variation signal generating portion 42 obtains a difference between the input torque command τr at present and the previous torque command τr, and generates a torque variation signal dτ from this differential value, the torque variation signal dτ is represented by the following expression (3).

$$d\tau = s \cdot \tau r \tag{3}$$

Since the machine velocity vm detected by the velocity detector generally contains the noise component of high frequency, the use of pure differentiation will increase the noise component, causing an estimation error for the mechanical constant. Therefore, the acceleration variation signal generating portion 41 obtains an acceleration variation signal da for the input machine velocity vm by pseudo differential operation having the low pass filter characteristic, instead of pure differentiation. Assuming that the low pass filter characteristic function is F(s), the pseudo acceleration signal af is represented by the following expressions (4) and (5), and the acceleration variation signal da is calculated by the following expression (6).

$$af = s \cdot F(s) \cdot vm \tag{4}$$

$$af = F(s) \cdot am \tag{5}$$

$$da = s \cdot af \tag{6}$$

If the expressions (2), (3), (5) and (6) are put together, and the low pass filter characteristic function F(s) is ignored as the ideal filter, the torque variation signal dτ can be represented by the following expression (7).

$$d\tau = s \cdot \tau d + J \cdot da \tag{7}$$

In the expression (7), because the right side first term becomes zero in a steady state where there is no disturbance torque τd, the inertial moment J can be represented by the following expression (8), whereby the inertial moment J for the drive machine 32 can be estimated as a ratio of the torque variation signal dτ to the acceleration variation signal da.

$$J = d\tau/da \qquad (8)$$

The mechanical constant estimating device as shown in FIG. 7 employs a sequential least square method in the expression (8) to improve the estimation precision.

Supposing that the inertial moment estimated value at the k-th point of time is Je (k) and the inertial moment estimated value at the previous ((k−1)-th) point of time is Je(k−1), the operation expression for estimating the inertial moment based on the sequential least square method is shown in the following expressions (9) to (11).

$$Je(k) = Je(k-1) + P(k) \cdot da(k) \cdot (d\tau(k) - da(k) \cdot Je(k-1)) \qquad (9)$$

$$P(k) = P(k-1)/(\lambda + P(k-1) \cdot da(k)2) \qquad (10)$$

$$G(k) = P(k) \cdot da(k) \qquad (11)$$

In the above expressions, λ is a constant called a forgetfulness factor, and is chosen to be slightly smaller than one to cope with a change in the inertial moment of the drive machine. Also, P(k) is an estimation gain parameter of one kind provided in the mechanical constant estimating operation, and updated while changing as the acceleration variation signal da is varied in magnitude.

The estimation gain G(K) in the estimation gain portion 45 is represented by the expression (11) including the operation expression (10) for the estimation gain parameter P(k).

If the inertial moment estimated value Je(k−1) at the previous ((k−1)-th) point of time is a true value, the right side second term of the expression (9) becomes zero, so that the inertial moment estimated value Je is not updated.

However, if the inertial moment estimated value Je (k−1) at the previous ((k−1)-th) point of time is different from the true value, an error term of torque variation (dτ(k)−da(k)·Je (k−1)) arises with the estimation error, whereby the inertial moment estimated value Je(k) at the k-th point is equal to the sum of the previous inertial moment estimated value Je(k−1) at the previous point of time and the error term of torque variation multiplied by the estimation gain G(k), as shown in the expression (9).

While the above discussion is concerned with an instance where there is no disturbance (disturbance torque τd=0), a moment at which an impact disturbance is applied in the steady state will be contemplated.

Supposing that the torque variation occurring upon an impact disturbance applied in a direction of obstructing the rotation of motor in the steady state is dτ' and the acceleration variation is da', employing the expression (9)

$$Je(k) = Je(k-1) + P(k) \cdot da(k) \cdot (d\tau(k) - da(k) \cdot Je(k-1))$$

the following expression (12) results.

$$Je(k) = Je(k-1) + P(k) \cdot da'(k) \cdot (d\tau'(k) - da'(k) \cdot Je(k-1)) \qquad (12)$$

When an impact disturbance is applied in a direction of impeding the rotation of motor, the motor is decelerated momentarily, thereby giving rise to a great acceleration variation of da'<0.

On one hand, a disturbance torque variation s·τd>0 arises at a moment when a disturbance torque of τd>0 is applied, and a great torque variation of dτ'>0 arises to compensate for its torque.

In the expression (12), the error term of torque variation (dτ'(k)−da'(k)·Je(k−1)) rapidly increases because dτ'>0 and da'<0, and the right side second term rapidly decreases because da'<0, whereby the inertial moment estimated value is erroneously estimated to be a significantly small value.

Since the inertial moment estimated value Je is employed for the auto-tuning of control gain in the torque command generating portion 30, as shown in FIG. 6, if the inertial moment is erroneously estimated, the result has an effect on the gain of control system to make it impossible to produce a torque command to make a desired operation, possibly leading to a worse control performance and an unstable phenomenon such as oscillation of the drive machine.

FIGS. 8A and 8B are graphs showing the relation between the disturbance torque and the inertial moment estimated value in the conventional mechanical constant estimating device. FIG. 8A is a graph showing the characteristic of disturbance torque with respect to the time in the drive machine, and FIG. 8B is a graph showing the characteristic of inertial moment with respect to the time. In FIG. 8A, τd represents the disturbance torque, and in FIG. 8B, the solid line indicates the true value of inertial moment and the broken line indicates the inertial moment estimated value.

In the conventional mechanical constant estimating device, the inertial moment estimated value is substantially the true value, before the disturbance torque is applied, but the inertial moment estimated value rapidly decreases at the same time when the disturbance torque is applied, resulting in a greater error with respect to the inertial moment true value. After the estimated value rapidly decreases, it takes considerable time to restore the original inertial moment estimated value.

It is demanded that the mechanical constant estimation is employed not only for the conventional cutting machine or robot having a variable load but also for the abutment on the conveyer for stopping the conveyed substance at a desired position by abutting it against the equipment. However, there is a problem that the conventional mechanical constant estimating device cannot be used, if a large impact disturbance is applied to the drive machine, because it is difficult to perform the inertial moment estimation correctly, as described above.

The above phenomenon appears with the typical auto-tuning configuration, as shown in FIG. 6, but is especially remarkable with the mechanical constant estimating device using a recursive operation method such as a sequential least square method, as shown in FIG. 7.

The mechanical constant estimating operation by the sequential least square method can avoid the misestimation of inertial moment by choosing the forgetfulness factor λ to be a sufficiently smaller value than one and reducing the response of inertial moment estimation. However, if the forgetfulness factor is smaller, the estimating device has a smaller estimation gain, and a lower estimation sensitivity to its input, thereby being less responsive to an abrupt change such as an impact disturbance to have a slower response when the estimated value of inertial moment is different from the true value, resulting in a problem of aggravating the performance of inertial moment estimation.

FIG. 9 is a block diagram of a velocity control system containing the conventional disturbance observer and mechanical constant estimating device. In FIG. 9, reference numerals 31 to 33, and reference symbols τr, τd, vm and τr' denote the same parts as those of FIG. 6, and their description is omitted. Reference numeral 35 denotes a torque command generating portion, 36 denotes a mechanical constant estimating device for estimating the inertial moment estimated value Je by inputting the machine velocity vm of the drive machine 32 and a torque command τr' not containing any disturbance torque component due to impact disturbance, and 37 denotes a disturbance observer for removing the disturbance.

FIG. 9 is to solve the problem associated with the conventional mechanical constant estimating device that the inertial moment estimation is difficult to correctly perform when a large impact disturbance is applied to the drive machine, in which the torque command τr' having disturbance removed by the disturbance observer is input into the mechanical constant estimating device to make the mechanical constant estimation without being affected by impact disturbance.

As the torque command input into the mechanical constant estimating device 36, the torque command τr' not containing any disturbance torque component due to impact disturbance is employed to make the mechanical constant estimation without being affected by the impact disturbance, but is not practical because there is the risk that the operation becomes unstable due to the interference of the auto-tuning of control system gain by the mechanical constant estimating device and the disturbance removal by disturbance observer, in which there is a problem that the control system is so complex as to make it difficult to grasp the convergence characteristic.

This invention has been achieved to solve the above-mentioned problems, and it is an object of the invention to provide a mechanical constant estimating device that can estimate the inertial moment correctly even when a large impact disturbance is applied to a drive machine.

DISCLOSURE OF THE INVENTION

The present invention provides a mechanical constant estimating device comprising an acceleration signal generating portion for generating an acceleration signal of low frequency by inputting a machine velocity of a drive machine employing an actuator such as a motor, a pseudo torque signal generating portion for generating a pseudo torque signal of low frequency by inputting a torque command and removing the noise, a multiplication circuit for calculating a product of the acceleration signal and a previous mechanical constant estimated value, a torque error signal calculating portion for calculating a torque error signal by subtracting the product obtained by the multiplication circuit from the pseudo torque signal of low frequency, a torque error derivative signal generating portion for generating a torque error derivative signal by inputting the torque error signal, a mechanical constant estimation gain portion for estimating a mechanical constant by inputting the torque error derivative signal, and a mechanical constant estimated value calculating portion for calculating the mechanical constant estimated value by adding the previous mechanical constant estimated value to an error output from the mechanical constant estimation gain portion, wherein the torque error signal calculated by the torque error signal calculating portion is output as a disturbance torque estimated value, and the mechanical constant estimation gain portion starts or stops to update the mechanical constant estimating operation, or changes the mechanical constant estimation gain, on the basis of the disturbance torque estimated value. Therefore, the mechanical constant of the drive machine and a disturbance element acting on the drive machine can be estimated at the same time, whereby the misestimation of the mechanical constant due to the disturbance element and the misestimation of the disturbance element due to a change in the mechanical constant can be prevented.

Also, the mechanical constant estimating device further comprises at least two or more disturbance torque extracting portions having a filter characteristic for decomposing and extracting a frequency component from the disturbance torque by inputting the torque error signal calculated by the torque error signal calculating portion, wherein the mechanical constant estimation gain portion starts or stops to update the mechanical constant estimating operation, or changes the mechanical constant estimation gain, on the basis of the disturbance torque component with the frequency component decomposed that is extracted from the disturbance torque extracting portion. Therefore, the disturbance element of frequency component specific to the machine or the use can be taken out, whereby the misestimation of the mechanical constant due to the disturbance element and the misestimation of the disturbance element due to a change in the mechanical constant can be prevented.

Further, the mechanical constant estimation gain portion stops to update the mechanical constant estimating operation or reduces the mechanical constant estimation gain for a period from the time when a disturbance is applied to the drive machine to the time when a steady state is restored. Therefore, the misestimation of the mechanical constant due to the disturbance element and the misestimation of the disturbance element due to a change in the mechanical constant can be easily prevented.

Further, the mechanical constant estimation gain portion applies a statistical processing method such as a least square method in estimating the mechanical constant of the drive machine, and starts or stops to update the parameter calculation for use in estimating the mechanical constant, or changes the constant, on the basis of the disturbance torque estimated value. Therefore, the misestimation of the mechanical constant due to the disturbance element and the misestimation of the disturbance element due to a change in the mechanical constant can be easily prevented while keeping a high response.

Also, this invention provides a mechanical constant estimating device comprising an acceleration variation signal generating portion for generating an acceleration variation signal by inputting a machine velocity of a drive machine employing an actuator such as a motor, a torque variation signal generating portion for generating a torque variation signal by inputting a torque command and removing the noise, an acceleration variation vector generating portion for generating an acceleration variation vector by inputting the acceleration variation signal, a multiplication circuit for calculating a matrix product of a previous parameter vector estimated value composed of a mechanical constant estimated value and an estimated value of disturbance torque component and the acceleration variation vector, a subtracter for subtracting the product calculated by the multiplication circuit from the torque variation signal to output a torque error derivative signal, a mechanical constant estimation gain portion for estimating an error vector by inputting the torque error derivative signal, and an adder for adding the previous parameter vector estimated value to the error vector output from the mechanical constant estimation gain portion to output the mechanical constant estimated value, wherein the mechanical constant estimated value and the estimated value of disturbance torque component as a pair are estimated as a parameter vector estimated value at the same time. Therefore, the malfunction of estimating the inertial moment due to disturbance torque is prevented and the estimation result of high precision can be obtained.

BEST MODE FOR CARRYING OUT THE INVENTION

Embodiment 1

Figure 1:
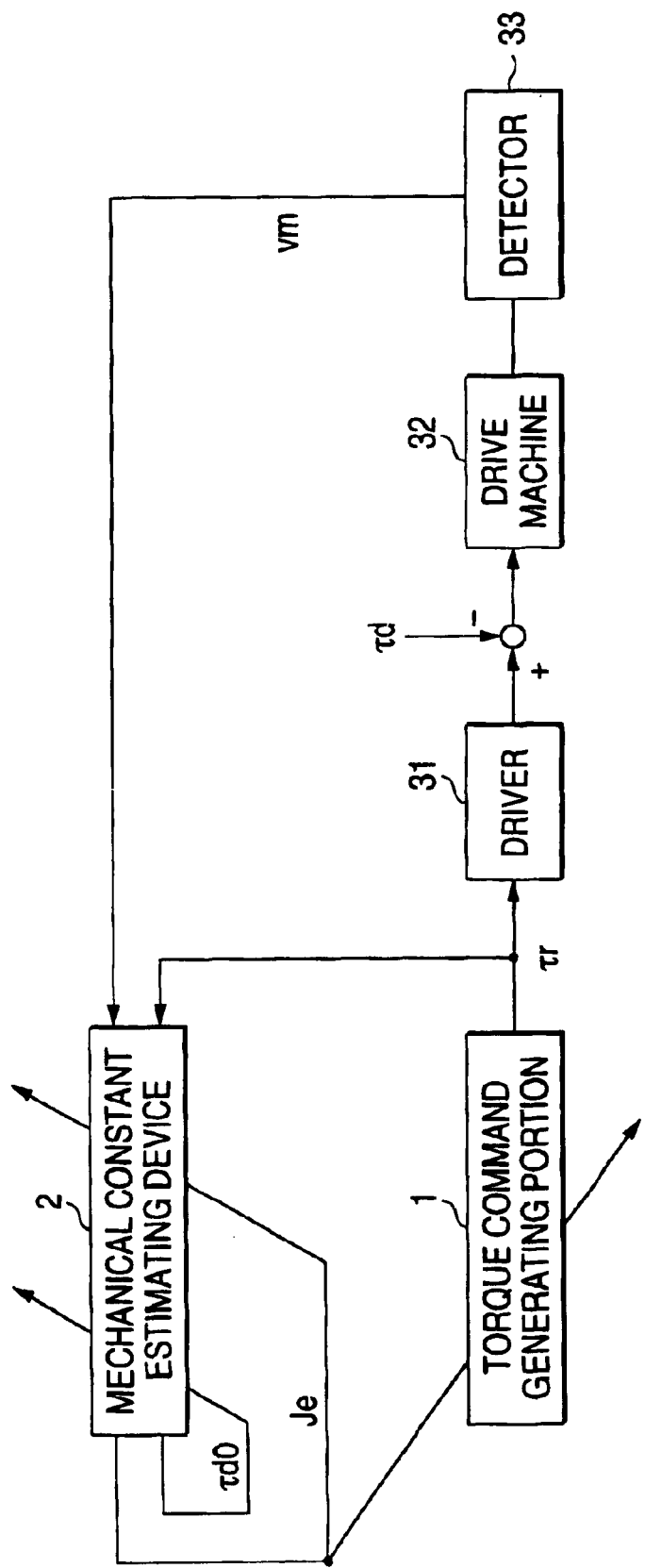
FIG. 1 is a block diagram of a velocity control system containing a mechanical constant estimating device according to an embodiment 1 of this invention.

FIG. 1 is a block diagram of a velocity control system containing a mechanical constant estimating device according to an embodiment 1 of this invention. In FIG. 1, reference numerals 31, 32 and 33, and reference symbols τr, τd and vm denote the same parts as those of FIG. 6 for the conventional example, and their description is omitted. Reference numeral 1 denotes a torque command generating portion for generating a torque command τr, and 2 denotes a mechanical constant estimating device for estimating the inertial moment estimated value and the disturbance estimated value by inputting the machine velocity vm and the torque signal τr. The torque command generating portion 1 adjusts the gain in accordance with the inertial moment estimated value output from the mechanical constant estimating device 2.

Figure 6:
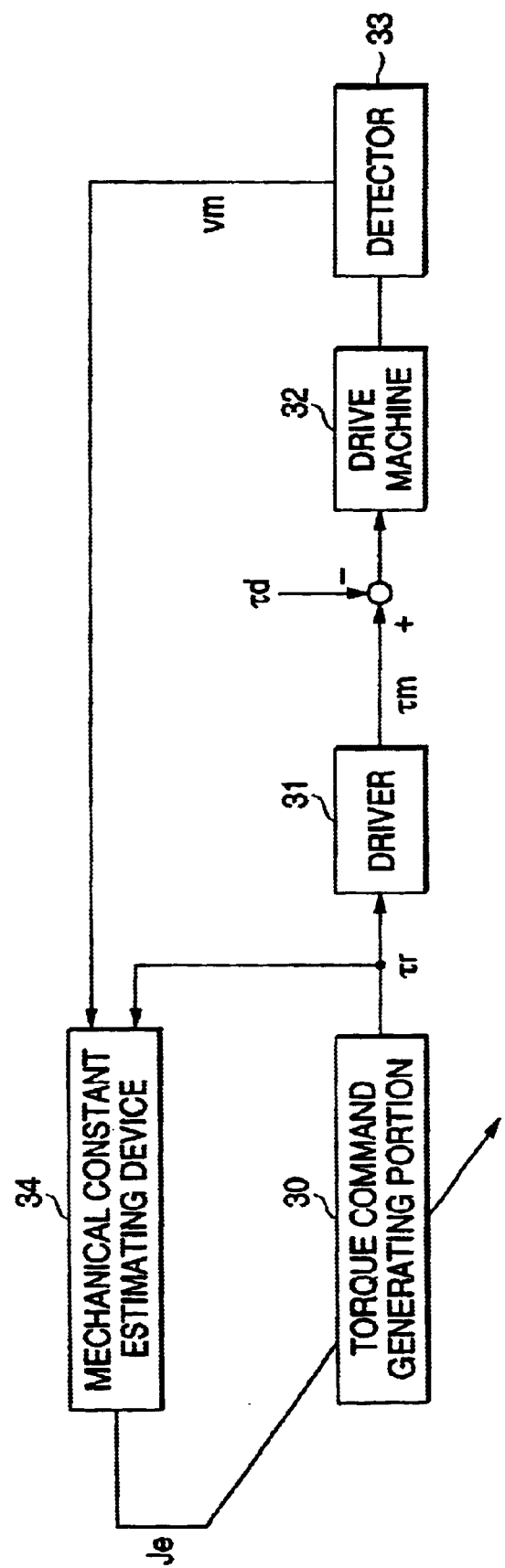
FIG. 6 is a block diagram of a velocity control system containing a conventional mechanical constant estimating device.
Figure 7:
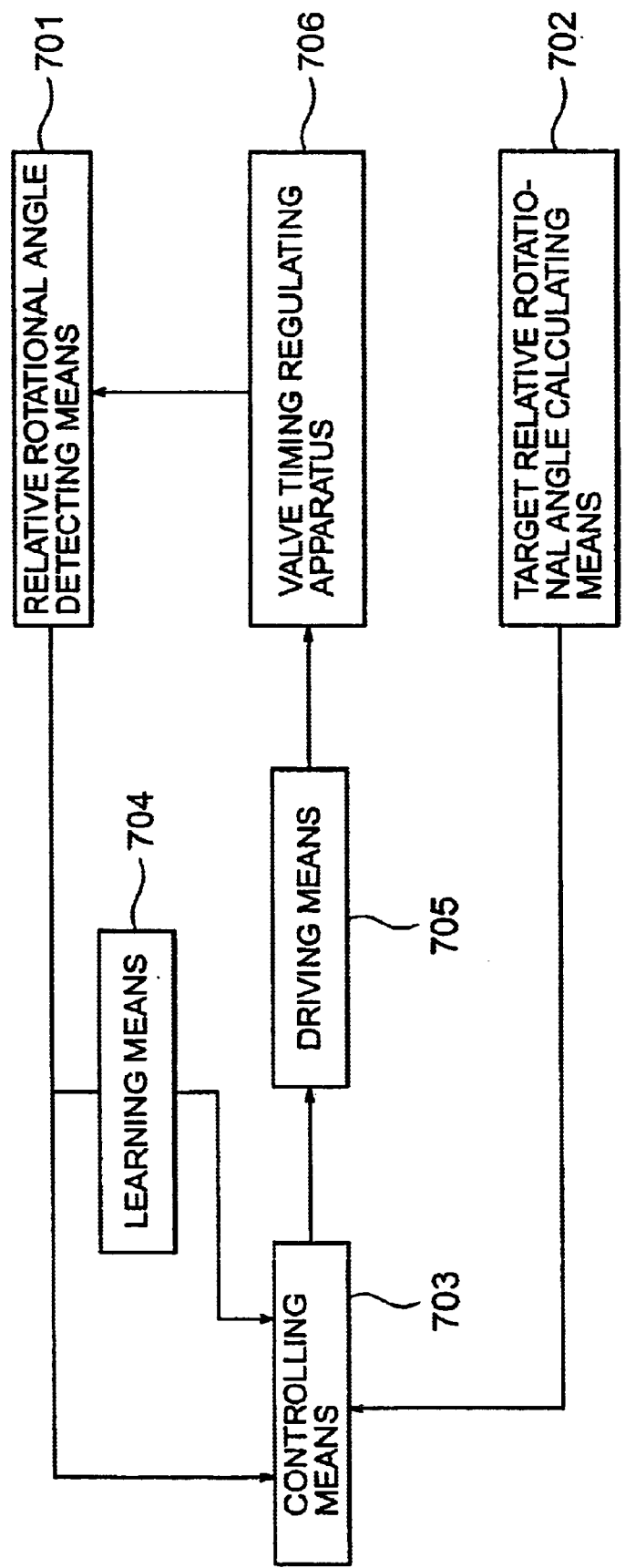
FIG. 7 is a block diagram showing the configuration of the conventional mechanical constant estimating device 34.
Figure 8A:
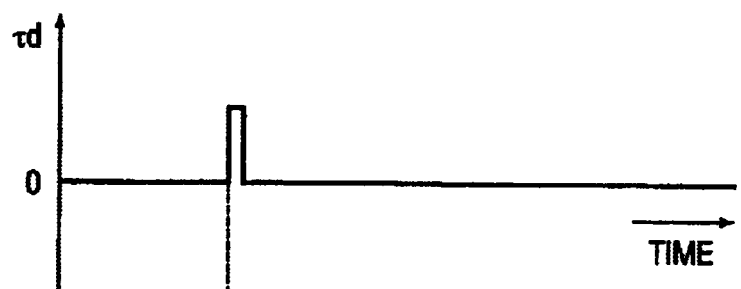
FIGS. 8A and 8B are graphs showing the relation between the disturbance torque and the inertial moment estimated value in the conventional mechanical constant estimating device.
Figure 8B:
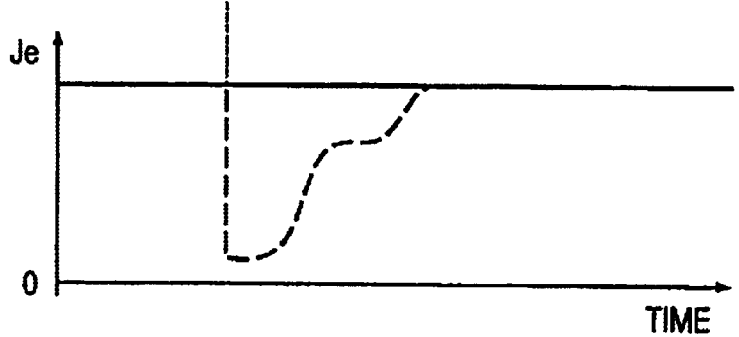
Figure 9:
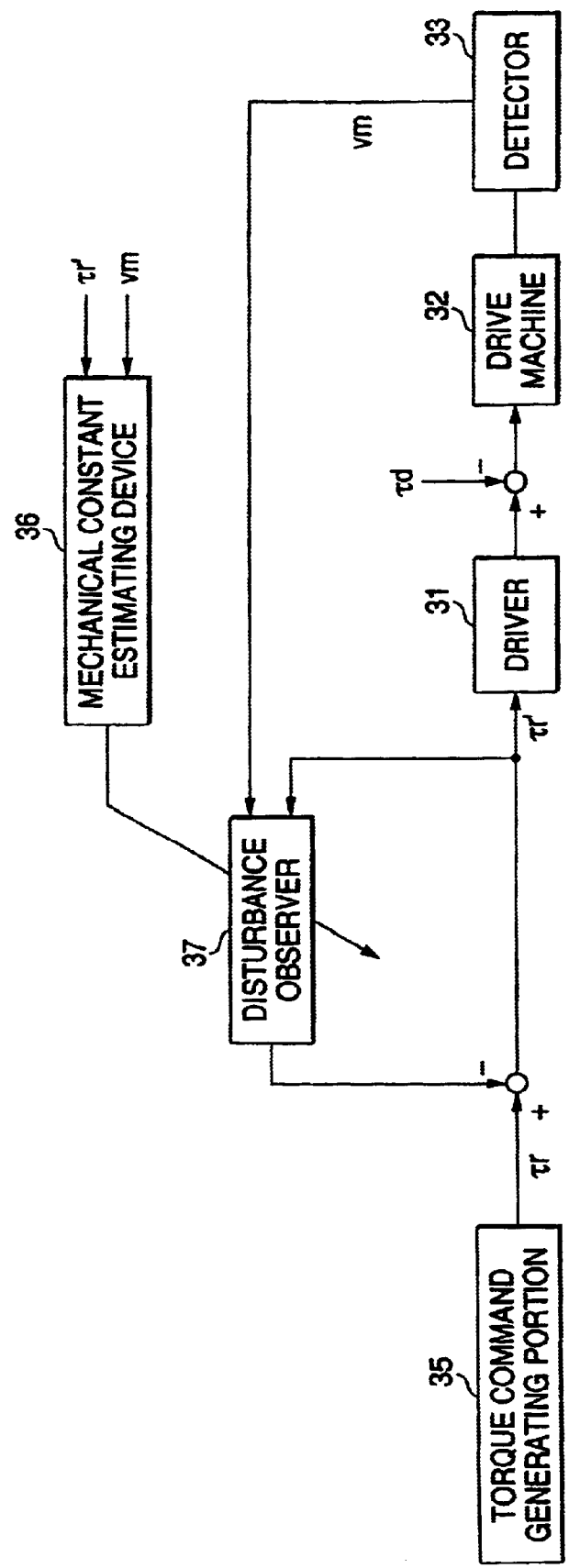
FIG. 9 is a block diagram of a velocity control system containing the conventional disturbance observer and mechanical constant estimating device.

The mechanical constant estimating device as shown in FIGS. 6, 7 and 9 for the conventional example outputs the inertial moment estimated value, but the mechanical constant estimating device of the embodiment 1 outputs the inertial moment estimated value and the disturbance estimated value.

Figure 2:
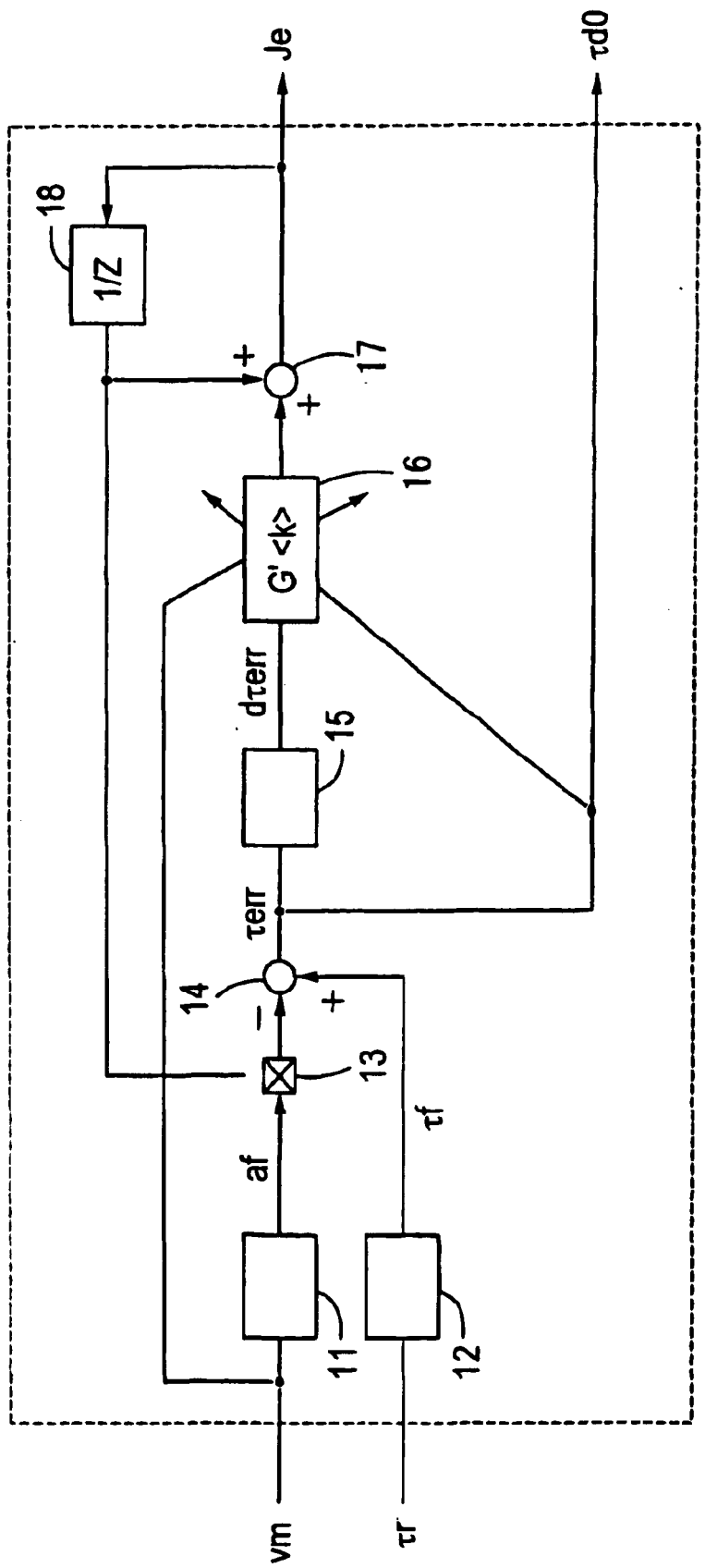
FIG. 2 is a block diagram showing the configuration of the mechanical constant estimating device 2 according to the embodoment 1 of this invention.

FIG. 2 is a block diagram showing the configuration of the mechanical constant estimating device 2 according to the embodiment 1 of this invention. In FIG. 2, reference numeral 11 denotes an acceleration signal generating portion for generating an acceleration signal af of low frequency by inputting a machine velocity vm, and 12 denotes a pseudo torque signal generating portion for generating a pseudo torque signal τf of low frequency by inputting a torque command τr and removing the noise. Also, reference numeral 13 denotes a multiplication circuit for calculating a product of the acceleration signal af of low frequency and the previous inertial moment estimated value Je (k−1) held in an inertial moment estimated value holding portion 18, and 14 denotes a torque error signal calculating portion for calculating a torque error signal τerr by subtracting the product of the acceleration signal af of low frequency and the previous inertial moment estimated value Je(k−1) obtained in the multiplication circuit 13 from the pseudo torque signal τf of low frequency. Also, reference numeral 15 denotes a torque error derivative signal generating portion for generating a torque error derivative signal dτerr by inputting the torque error signal τerr, and 16 denotes a mechanical constant estimation gain portion for estimating the mechanical constant by inputting the torque error derivative signal dτerr. Also, reference numeral 17 denotes an inertial moment estimated value calculating portion for calculating an inertial moment estimated value Je(k) as the mechanical constant estimated value by adding the previous inertial moment estimated value Je(k−1) as the mechanical constant estimated value to the mechanical constant estimated value output from the mechanical constant estimation gain portion 16, and 18 denotes an inertial moment estimated value hold portion for holding the inertial moment estimated value Je(k).

Referring to FIGS. 1 and 2, the operation of the mechanical constant estimating device according to the embodiment 1 of the invention will be described below.

It is assumed here that the driving torque Tm actually produced in the actuator 31 coincides with the torque command τr. Supposing that the disturbance torque applied to the drive machine 32 is τd, the machine velocity of the drive machine 32 is vm, and the inertial moment (true value) of the drive machine 32 is J, the machine acceleration am of the drive machine 32 and the torque command τr are represented by the following expressions (13) and (14).

$$am = s \cdot vm \quad (13)$$

$$Tr = \tau d + J \cdot am \quad (14)$$

where s is the Laplace operator.

The acceleration signal generating portion 11 generates an acceleration signal af with high frequency components removed by inputting the machine velocity vm and making the arithmetical operation as represented by the following expression (15).

$$af = s \cdot F(s) \cdot vm \quad (15)$$

where F(s) is a low pass filter characteristic function for removing the high frequency components contained in the machine velocity vm.

The pseudo torque signal generating portion 12 generates a pseudo torque signal τf with the high frequency components removed by inputting a torque command τr, appending the same low pass filter characteristic as that of the acceleration signal generating portion 11, and making the calculation in accordance with the following expression (16).

$$\tau f = F(s) \cdot \tau r \quad (16)$$

Assuming that the torque error signal τerr is a difference between the product of the acceleration signal af and the previous inertial moment estimated value Je(k−1) and the pseudo torque signal τf, the torque error signal τerr is represented by the following expression (17).

$$\tau err = \tau f - af \cdot Je(k-1) \quad (17)$$

Herein, assuming that the previous inertial moment estimated value Je (k−1) indicates the true value, and the low pass filter characteristic is ignored as ideal, from the expressions (15) and (16), the torque error signal is represented by the expression (18), $$\tau err = \tau r - J \cdot am \quad (18)$$

Comparing the expression (18) with the expression (14), it can be found that the torque error signal Terr is nothing but the disturbance torque τd. Namely, the disturbance torque τd0 can be estimated with the above configuration.

In the conventional mechanical constant estimating device as shown in FIG. 7, since the acceleration variation signal da and the torque variation signal dτ required to estimate the inertial moment J are directly generated in the acceleration variation signal generating portion 41 and the torque variation signal generating portion 42, the disturbance estimated value can not be obtained.

In the embodiment 1, the acceleration signal generating portion 11 generates the acceleration signal af with high frequency components removed, the pseudo torque signal generating portion 12 generates the pseudo torque signal If with high frequency components removed, the torque error signal calculating portion 14 calculates the torque error signal Terr, and the torque error derivative signal generating portion 15 generates the torque error derivative signal dτerr, whereby the disturbance torque estimated value and the inertial moment estimated value can be calculated through a series of processings.

In the calculation of the expression (17), even if the previous inertial moment estimated value Je(k−1) is deviated from the true value, the disturbance torque component such as the impulse disturbance may often contain different frequency components from the torque error component caused by a deviation of the inertial moment, whereby the disturbance torque component can be taken out.

The torque error derivative signal generating portion 15 generates a torque error derivative signal by inputting the torque error signal τerr, and differentiating it. Supposing that the torque error derivative signal is dτerr, and employing the expression (17), the torque error derivative signal generating portion 15 makes the calculation in accordance with the expression (19).

$$d\tau err = s \cdot (\tau f - af \cdot Je(k-1)) \quad (19)$$

The expressions (15) and (16) are substituted into the above expression (19), and transformed, employing the expressions (3) and (6). Then, if the low pass filter characteristic function F(s) is ignored as ideal, the expression (19) is replaced with the following expression (20).

$$d\tau err = d\tau - da \cdot Je(k-1) \quad (20)$$

If it is assumed that the mechanical constant estimation gain portion 16 is the same as that of the conventional mechanical constant estimating device, the inertial moment estimation operation expression can be represented by the expression (21) on the basis of the expression (20).

$$Je(k) = Je(k-1) + G(k) \cdot (d\tau(k) - da(k) \cdot Je(k-1)) \quad (21)$$

Since the above expression (21) is equivalent to the estimating operation expression (9) of inertial moment in the conventional mechanical constant estimating device, the mechanical constant estimating device can perform the mechanical constant estimating operation in the same way as the conventional mechanical constant estimating device.

The mechanical constant estimation gain portion 16 calculates the estimation gain G(k) and the estimation gain parameter P(k) in accordance with the following expressions (22) and (23), and multiplies the torque error derivative signal dτerr by the estimation gain.

$$G(k) = P(k) \cdot da(k) \cdot nf(k) \quad (22)$$

$$P(k) = P(k-1)/(\lambda + P(k-1) \cdot da(k)2) \quad (23)$$

where nf (k) is a flag based on the disturbance torque estimated value τd0. The flag nf(k) is equal to one in a steady state before disturbance torque is applied, and is equal to zero for a period from the moment at which the disturbance torque is above a certain threshold value till the steady state is restored. Accordingly, the estimation gain G(k) is equal to zero for the period of nf(k)=0, whereby the inertial moment estimated value is not updated in accordance with the expression (21). Namely, the output from the mechanical constant estimation gain portion 16 is the inertial moment component without disturbance torque component.

Figure 3A:
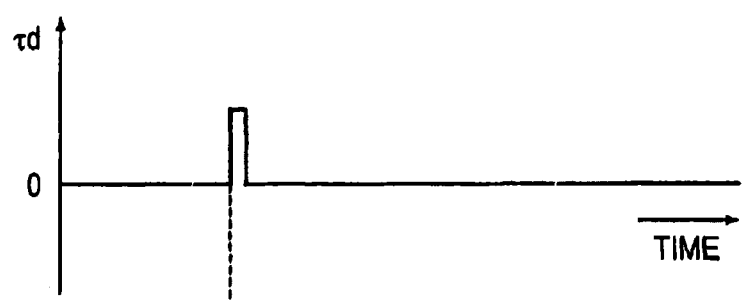
FIGS. 3A and 3B are graphs showing the relation between the disturbance torque and the inertial moment estimated value according to the embodoment 1 of this invention.
Figure 3B:
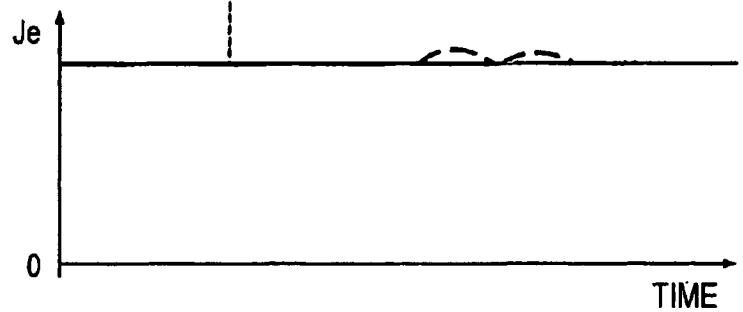

FIGS. 3A and 3B are graphs showing the relation between the disturbance torque and the inertial moment estimated value according to the embodiment 1 of this invention. FIG. 3A is a graph showing the characteristic of disturbance torque to the time in the drive machine, and FIG. 3B is a graph showing the characteristic of inertial moment to the time. In FIG. 3A, τd represents the disturbance torque, and in FIG. 3B, the solid line indicates the true value of inertial moment and the broken line indicates the inertial moment estimated value in the embodiment 1.

In the mechanical constant estimating device according to the embodiment 1 of the invention, since the inertial moment variation and the disturbance torque can be separated at high precision, the inertial moment estimated value is not substantially affected by the disturbance torque, even if it is applied, as indicated by the dotted line, and almost coincident with the true value, thereby preventing the misestimation of the mechanical constant.

The mechanical constant estimating device according to the embodiment 1 detects the disturbance torque, in which the mechanical constant estimation is conventionally made in the steady state till the disturbance torque is applied, and the inertial moment estimated value is not updated for the period in which the disturbance torque has the adverse effect. Therefore, the mechanical constant estimated value can be calculated at high precision without being affected by the impact disturbance. Also, this mechanical constant estimating device can be utilized for the purposes of the abutment that could not be conventionally employed.

Also, in the mechanical constant estimating device according to the embodiment 1 of the invention, even when the inertial moment is changed, the disturbance torque τd0 is calculated on the basis of the inertial moment estimated value at each point of time, whereby the highly precise disturbance estimated value can be obtained.

Embodiment 2

Figure 4:
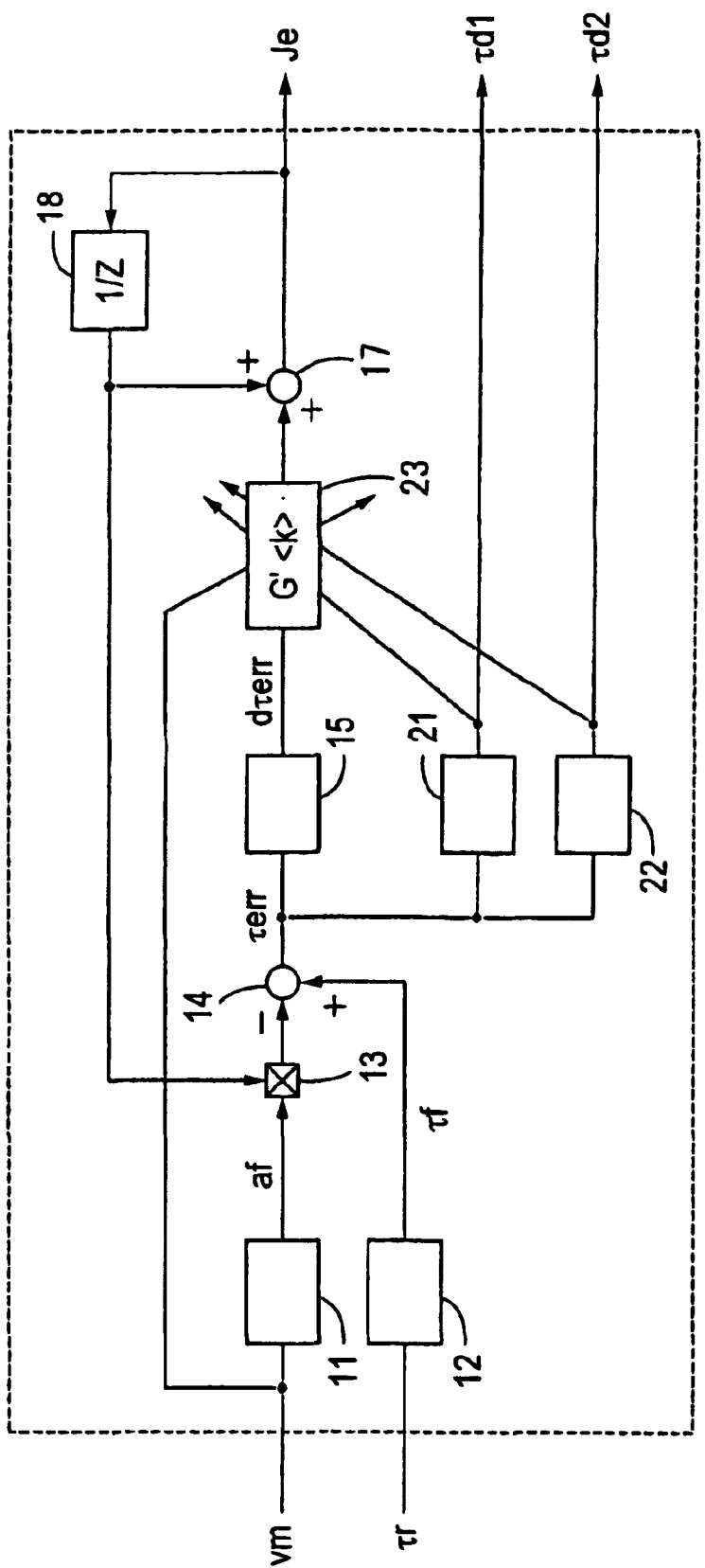
FIG. 4 is a block diagram showing the configuration of a mechanical constant estimating device according to an embodiment 2 of this invention.

FIG. 4 is a block diagram showing the configuration of a mechanical constant estimating device according to an embodiment 2 of this invention. In FIG. 4, reference numerals 11 to 15, 17 and 18 are the same as those of FIG. 2, and their description is omitted. Reference numeral 21 denotes a low frequency disturbance torque extracting portion having a low pass filter characteristic and inputting a torque error signal τerr and outputting a low frequency disturbance torque component τd1, 22 denotes a high frequency disturbance torque extracting portion having a high pass filter characteristic and inputting the torque error signal τerr and outputting a high frequency disturbance torque component τd2, and 23 denotes a mechanical constant estimation gain portion for estimating an inertial moment by reflecting the low frequency torque component τd1 and the high frequency torque component τd2.

The low pass filter in the low frequency disturbance torque extracting portion 21 has a different characteristic from the low pass filter used in the acceleration signal generating portion 11 and the pseudo torque signal generating portion 12, and extracts only the low frequency components from the signals having higher harmonic noise component removed through the low pass filter in the acceleration signal generating portion 11 and the pseudo torque signal generating portion 12. Also, the high pass filter in the high frequency disturbance torque extracting portion 22 extracts only the high frequency components from the signals having higher harmonic noise component removed through the low pass filter in the acceleration signal generating portion 11 and the pseudo torque signal generating portion 12.

The operation of the mechanical constant estimating device according to the embodiment 2 of the invention will be described below.

The disturbance torque τd acting on the drive machine does not have necessarily invariable feature depending on the sort of disturbance torque, such as including high frequency components of disturbance torque in the case of impact disturbance, and low frequency components of disturbance torque in the case of friction. Therefore, in the embodiment 2, the disturbance component is frequency divided, employing two filter elements of the low frequency disturbance torque extracting portion 21 and the high frequency disturbance torque extracting portion 22.

For the high frequency disturbance, like the embodiment 1, the estimation gain is equal to zero for a fixed period from a moment at which the disturbance torque is above a threshold value till the steady state is restored, thereby not updating the inertial moment estimated value. On the other hand, for the low frequency disturbance acting on the mechanical constant estimation steadily, the mechanical constant estimation gain is made smaller or the low frequency disturbance estimated value is removed from the input into the mechanical constant estimation gain portion 23, depending on the low frequency disturbance estimated value, whereby the malfunction of the mechanical constant estimation due to low frequency disturbance element is prevented.

In the embodiment 1, the torque variation is treated collectively as impact disturbance, and the mechanical constant estimated value contains an error, owing to low frequency disturbance components, if employed for the purposes of the drive machine with large friction, for example. However, in the embodiment 2, since low frequency disturbance components are separated and extracted, it is possible to suppress the error owing to the low frequency disturbance components, whereby the mechanical contact estimating device can be also employed for the purposes of the drive machine containing mostly low frequency disturbance components and with very large friction.

In the embodiment 2 as described above, the disturbance components are frequency divided and extracted, using two filter elements, but the frequency components of disturbance can be extracted more precisely by providing additional filter element, thereby considering the effect of disturbance components at higher precision.

Embodiment 3

Figure 5:
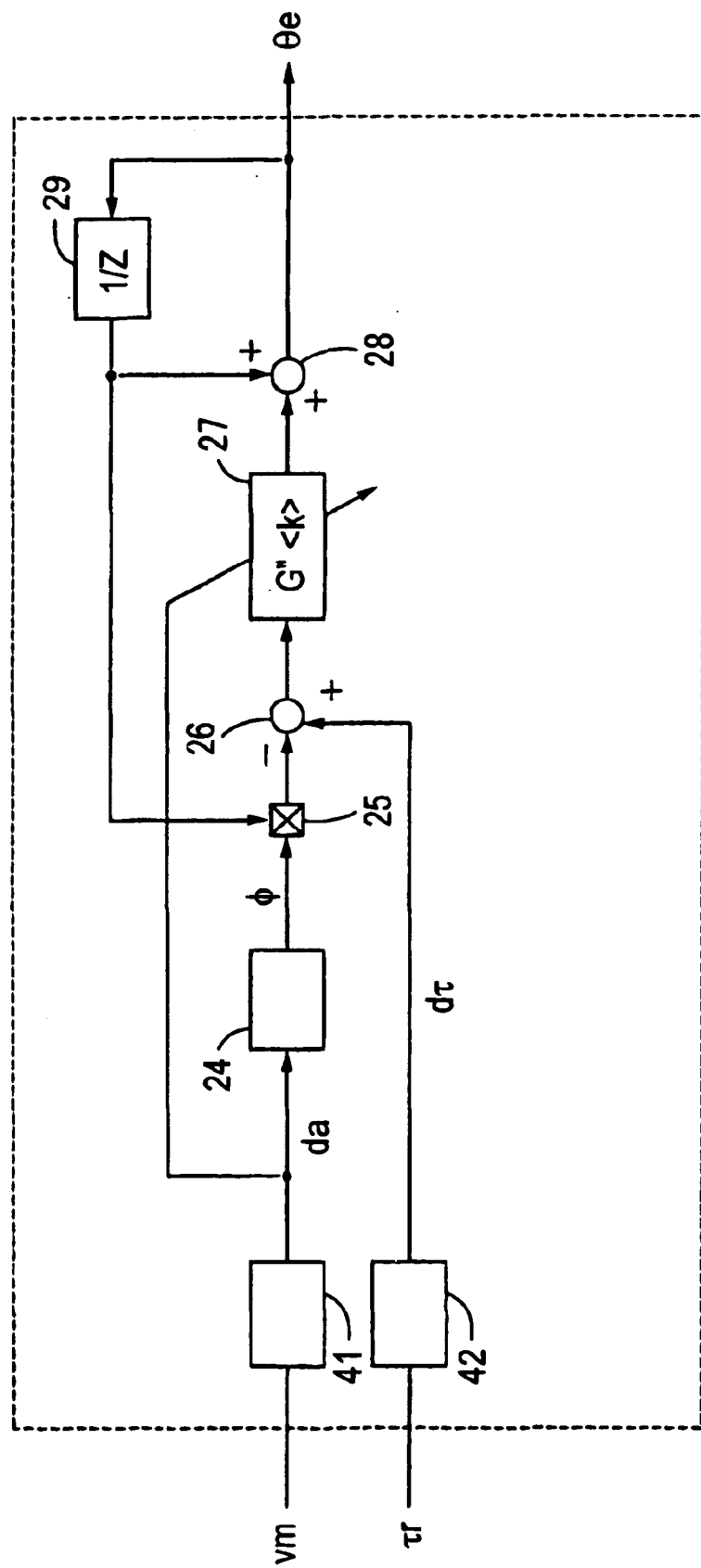
FIG. 5 is a block diagram showing the configuration of a mechanical constant estimating device according to an embodiment 3 of this invention.

FIG. 5 is a block diagram showing the configuration of a mechanical constant estimating device according to an embodiment 3 of this invention.

In FIG. 5, reference numerals 41 and 42, and reference symbols vm, τr, da and dτ designate the same parts as in FIG. 7 for the conventional example, and their description is omitted. Reference numeral 24 denotes an acceleration variation vector generating portion for generating an acceleration variation vector φ by inputting an acceleration variation signal da, 25 denotes a multiplication circuit for multiplying the acceleration variation vector φ and the previous parameter vector estimated value θe(k−1) held in a parameter vector estimated value holding portion 29, 26 denotes a subtracting operation portion for subtracting the product of the acceleration variation vector φ and the previous inertial moment estimated value Je(k−1) obtained in the multiplication circuit 25 from the torque variation signal dτ, 27 denotes a mechanical constant estimation gain portion for calculating a parameter error vector estimated value by inputting a torque error derivative signal from the subtracter 26, 28 denotes an operation portion for calculating a parameter vector estimated value θe (k) by adding the previous parameter vector estimated value θe (k−1) to an error output from the mechanical constant estimation gain portion 27, and 29 denotes a parameter vector estimated value holding portion for holding the parameter vector estimated value θe. Reference symbol θe denotes the parameter vector estimated value that is composed of the inertial moment estimated value and the disturbance torque variation estimated value as a pair.

In the figure, the output from the acceleration variation vector generating portion 24, the output from the mechanical constant estimation gain portion 27, the output from the operation portion 28, and the output from the parameter vector estimated value holding portion 29 indicate the vector.

The operation of the mechanical constant estimating device according to the embodiment 3 of the invention will be described below.

In the expression (7) regarding the torque variation signal dτ, replacing a differential s·τd of the disturbance torque with a disturbance torque variation dτd, the expression (7) can be rewritten as in the expression (24).

$$d\tau = d\tau d + J \cdot da \tag{24}$$

In the embodiments 1 and 2, the estimation is made employing the least square method for the inertial moment, while in the embodiment 3, the parameter vector estimated value θe is estimated employing the least square method for both the inertial moment J and the disturbance torque variation dτd.

First of all, the constant y, vector φ, and vector θ as shown in the expressions (25) to (27) are introduced.

$$y = d\tau \tag{25}$$

$$\phi = [da\ 1] \tag{26}$$

$$\theta = [J\ d\tau d]^T \tag{27}$$

ps where $[\ ]^T$ in the expression (27) indicates a transposed vector. Rewriting the expression (24) using the above expressions (25) to (27), the expression (28) is obtained.

$$y = \phi^T \theta \tag{28}$$

The expression (28) shows that the parameter vector θ can be estimated, employing y and φ obtained from the torque variation signal dτ and the acceleration variation signal da. The mechanical constant estimating device as shown in FIG. 5 employs the least square method for the expression (28).

Supposing that the inertial moment estimated value at the k-th point of time is Je(k) and the disturbance torque variation estimated value is dτde(k), the parameter vector estimated value is defined by the expression (29).

$$\theta e = [Je \ d\tau de]^T \quad (29)$$

The estimating operation expressions (30) to (32) for estimated parameter vector θe based on the sequential least square method are represented in the following way.

$$\theta e(k) = \theta e(k-1) + P(k) \cdot \phi(k) \cdot (y(k) - \phi^T(k) \cdot \theta e(k-1)) \quad (30)$$

$$P(k) = P(k-1) - P(k-1)\phi(k)\phi^T(k)P(k-1)/(\lambda + \phi^T(k)P(k-1)\phi(k)) \quad (31)$$

$$G''(k) = P(k)\phi(k) \quad (32)$$

The arithmetical operations for the above expressions are the same as in the conventional example, except that P, φ and θe are vector quantities.

In the mechanical constant estimating device of the conventional example, the inertial moment is only estimated, and the disturbance torque component, if mixed, is developed as the inertial moment error component.

On one hand, in the embodiment 3, the estimation is made from the relational expression between the inertial moment and the disturbance torque given beforehand, assuming that each of the inertial moment and the disturbance torque exists separately. For example, when contained in an input signal, the impact disturbance component is estimated mainly as the disturbance torque variation component, and scarcely appears in the inertial moment estimated value. Consequently, the malfunction of the inertial moment estimation with the disturbance torque is prevented, and the estimated result can be obtained at high precision.

Accordingly, the mechanical constant estimating device of the embodiment 3 can provide the same effect as the mechanical constant estimating device of the embodiment 1, without the use of the method of stopping the inertial moment estimating operation depending on the disturbance torque.

By the way, in the embodiments 1, 2 and 3 as described above, the inertial moment is estimated as the mechanical constant, but other mechanical constants may be estimated, including the elastic coefficient and the viscosity factor.

In the above discussion, the mechanical constant estimating operation is stopped, when the disturbance torque is above a certain threshold value, but the gain may be altered in such a way as to reduce the mechanical constant estimation gain depending on the disturbance torque, for example.

Also, in the above discussion, the mechanical constant estimating operation is stopped, when the disturbance torque is above a certain threshold value, but the arithmetical operation for the estimation gain parameter P(k) maybe stopped or the gain altered.

Also, in the above discussion, the flag f(k) is equalized to zero for a period from the moment when the disturbance torque is above a certain threshold value till the steady state is restored, but the point of time when the steady state is restored may be actually detected by observing the control response waveform for the machine velocity vm or the torque command τr, or may be obtained by providing a fixed delay time a delay time may be provided after the disturbance torque falls below the threshold value.

Also, in the above discussion, the machine velocity vm is detected using the velocity detector 33, but equivalently, the machine velocity vm may be obtained from a difference or differential of the mechanical position by detecting the mechanical position using the position detector.

Also, in the above discussion, the inertial moment estimated value Je for the drive machine is calculated by the least square method, but other statistical processing methods may be employed, including a fixed trace method as described in Institute of Electrical Engineers of Japan, treaties, Vol.114-D, No.4, p.424-p.431, or a non-normalized gradient method as described in the "System Identification for the Control with MATLAB" (Tokyo Electric University Publishing Office), p.6.

Also, in the above discussion, the torque error derivative signal generating portion 15 generates a torque error derivative signal dτerr by inputting a difference signal τerr between a product signal of the acceleration signal af and the previous inertial moment estimated value and the pseudo torque signal τf, and differentiating the difference signal τerr, but the high frequency components may be removed by appending a secondary low pass filter characteristic.

Also, in the above discussion, the mechanical constant and the disturbance are estimated in accordance with the same algorithm, but the same effect can be obtained by preparing the disturbance observer separately and reflecting the observation result to the mechanical constant estimation gain.

Industrial Applicability

As described above, the mechanical constant estimating device according to the present invention can perform correctly the estimation for the inertial moment, even if a large impact disturbance is applied to the drive machine. Therefore, the mechanical constant estimation device is suitably employed for the purposes of the abutment on the conveyer for stopping the conveyed substance at desired position by abutting it against the equipment.

What is claimed is:

1. A mechanical constant estimating device comprising:

an acceleration signal generating portion for generating an acceleration signal of low frequency by inputting a machine velocity of a drive machine employing an actuator such as a motor;

a pseudo torque signal generating portion for generating a pseudo torque signal of low frequency by inputting a torque command and removing the noise;

a multiplication circuit for calculating a product of said acceleration signal of low frequency and a previous mechanical constant estimated value;

a torque error signal calculating portion for calculating a torque error signal by subtracting the product obtained by said multiplication circuit from said pseudo torque signal of low frequency;

a torque error derivative signal generating portion for generating a torque error derivative signal by inputting the torque error signal;

a mechanical constant estimation gain portion for estimating a mechanical constant by inputting the torque error derivative signal; and a mechanical constant estimated value calculating portion for calculating the mechanical constant estimated value by adding the previous mechanical constant estimated value to an error output from said mechanical constant estimation gain portion;

characterized in that said torque error signal calculated by said torque error signal calculating portion is output as a disturbance torque estimated value, and said mechanical constant estimation gain portion starts or stops to update the mechanical constant estimating operation, or changes the mechanical constant estimation gain, on the basis of said disturbance torque estimated value.

2. The mechanical constant estimating device according to claim 1, further comprising at least two or more disturbance torque extracting portions having a filter characteristic for decomposing and extracting a frequency component of the disturbance torque by inputting said torque error signal calculated by said torque error signal calculating portion, characterized in that said mechanical constant estimation gain portion starts or stops to update the mechanical constant estimating operation, or changes the mechanical constant estimation gain, on the basis of the disturbance torque with the frequency component decomposed and extracted from said disturbance torque extracting portion.

3. The mechanical constant estimating device according to claim 1 or 2, characterized in that said mechanical constant estimation gain portion stops to update the mechanical constant estimating operation or reduces the mechanical constant estimation gain for a period from the time when a disturbance is applied to said drive machine to the time when a steady state is restored.

4. The mechanical constant estimating device according to claim 1 or 2, characterized in that said mechanical constant estimation gain portion applies a statistical processing method such as a least square method in estimating the mechanical constant of said drive machine, and starts or stops to update the parameter calculation for use in estimating the mechanical constant, or changes the constant, on the basis of said disturbance torque estimated value.

5. A mechanical constant estimating device comprising:

an acceleration variation signal generating portion for generating an acceleration variation signal by inputting a machine velocity of a drive machine employing an actuator such as a motor;

a torque variation signal generating portion for generating a torque variation signal by inputting a torque command and removing the noise;

an acceleration variation vector generating portion for generating an acceleration variation vector by inputting said acceleration variation signal;

a multiplication circuit for calculating a matrix product of a previous parameter vector estimated value composed of a mechanical constant estimated value and an estimated value of disturbance torque component and said acceleration variation vector;

a subtracter for subtracting the product calculated by said multiplication circuit from said torque variation signal to output a torque error derivative signal;

a mechanical constant estimation gain portion for estimating an error vector by inputting said torque error derivative signal; and an adder for adding the previous parameter vector estimated value to the error vector output from said mechanical constant estimation gain portion to output the mechanical constant estimated value;

characterized in that said mechanical constant estimated value and the estimated value of disturbance torque component as a pair are estimated as a parameter vector estimated value at the same time.

* * * * *